United States Patent [19]
Mathur et al.

[11] Patent Number: 4,971,136
[45] Date of Patent: Nov. 20, 1990

[54] DUAL FUEL HEAT PUMP CONTROLLER

[75] Inventors: Anoop Mathur, Shoreview; Wendy K. Foslien, Minneapolis, both of Minn.

[73] Assignee: Electric Power Research Institute, Palo Alto, Calif.

[21] Appl. No.: 441,977

[22] Filed: Nov. 28, 1989

[51] Int. Cl.$^5$ ............................................. F25B 29/00
[52] U.S. Cl. .......................................... 165/1; 165/72; 165/29; 165/11.1; 237/2 B; 236/94; 307/34; 307/35; 364/493; 364/557; 392/307
[58] Field of Search ...................... 165/1, 12, 29, 11.1; 237/2 B; 219/279; 236/94; 307/34, 35; 364/557, 492, 493, 494

[56] References Cited

U.S. PATENT DOCUMENTS

| | | | |
|---|---|---|---|
| 4,386,649 | 6/1983 | Hines et al. | 165/29 |
| 4,387,763 | 6/1983 | Beutor | 165/29 |
| 4,551,812 | 11/1985 | Gurr et al. | 307/35 |
| 4,627,484 | 12/1986 | Harshbarger, Jr. et al. | 165/29 |
| 4,645,908 | 2/1987 | Jones | 165/29 |
| 4,694,192 | 9/1987 | Payne et al. | 307/34 |
| 4,702,413 | 10/1987 | Beckey et al. | 165/29 |
| 4,716,957 | 1/1988 | Thompson et al. | 165/29 |
| 4,731,547 | 3/1988 | Aleuduff et al. | 364/494 |
| 4,795,088 | 1/1989 | Kobayashi et al. | 165/29 |
| 4,802,100 | 1/1989 | Aasen et al. | 364/492 |

Primary Examiner—John Ford
Attorney, Agent, or Firm—Haugen and Nikolai

[57] ABSTRACT

An operating system for a dual fuel heating system having first and second heat pump stages, first and second gas furnace stages, an executive controller for tracking time increments and call control strategies at appropriate levels, a demand control for calculating the amount of time each heat pump can be on during a predetermined time window, a data storage apparatus, a thermostat, a first predicting module for predicting non-heat pump electrical load based on a moving average, a second predicting module for predicting heat load based on a moving average, and a limiting module for setting demand limits for off-peak, mid-peak and peak periods. The executive controller is operated to initiate operation of the foregoing routines to determine, based on historical building profile information including non-heat pump electric power information the availability of heat pump power with no increase in demand charges during any given incremental interval. In a further aspect of the invention, break even points are calculated to determine the economic feasibility of increasing the demand set point incrementally in a dual fuel system. The system integrates intelligent demand logic and conventional thermostat logic algorithms into a dual fuel control system.

9 Claims, 5 Drawing Sheets

DUAL FUEL HEAT PUMP CONTROLLER

This invention is directed generally to control equipment for heating interior spaces and, more particularly, to an advanced controller for a dual fuel heat pump for commercial buildings.

BACKGROUND OF THE INVENTION

The economic use of various heating apparatus is an important goal of the building controls industry. However, until now, it is believed that a dual fuel control approach has not been provided to ensure minimizing energy costs to the consumer. Prior art systems controlling heating in interior zones with more than one heating unit have included, for example, systems as is disclosed in Thompson, et al., U.S. Pat. No. 4,716,957. Thompson, et al. discloses an air conditioning system comprising a heat pump and an auxiliary heater wherein a main controller controls an air duct multizone system. The controller includes a microprocessor and a memory. It receives information regarding the operating costs of the heat pump and of the auxiliary heater, which may be a gas burner, to ensure their cost effective use. Although the system checks simple gas energy costs against electric energy costs as a function of ambient temperature, it does not minimize electrical demand cost, and although demand charges are an important consideration in any heating environment, the system does not calculate a break-even demand set point.

Jones in U.S. Pat. No. 4,645,908 discloses a residential heating, cooling and energy management system that includes a heat pump and a microprocessor which is designed for use with a thermal storage device and does not switch between alternate fuel energy sources based on cost. Benton in U.S. Pat. No. 4,378,763 discloses a multistage thermostat using multi-rate integral action and exponential set point change for a heat pump and gas furnace combination. Benton's system reduces control point offset (known as droop). The signal processing means disclosed by Benton includes an integrator channel and a proportional constant channel in parallel. Benton's invention is aimed at ensuring most efficient restoration of a building to its daytime temperature after the building temperature has dropped to its set back temperature. Benton does not account for factors including demand cost, break even demand set point, gas cost, compared to electrical energy cost, predicted non-HVAC loads and heating loads. Thus, the system is not intended to reduce total utility bills, but instead to maximize use of the heat pump during the recovery period.

Beckey, et al. in U.S. Pat. No. 4,702,413 discloses a temperature control system using a single ramp rate control of a multi-plant environmental unit. A heat pump with an auxiliary electric heater is disclosed. A microprocessor and memory allow for energy savings through the set back functions. However, Beckey assumes that later stages are more costly than first stages, which is not always the case. Beckey provides no method to operate the auxiliary heat source without the heat pump.

Harshbarger, Jr., et al. in U.S. Pat. No. 4,627,484 discloses a heat pump control system utilizing auxiliary heat from a fossil fuel furnace. A microprocessor is utilized which includes economy of operation and the controls. Harshbarger, Jr. does not disclose any means for electrical demand monitoring, nor does he account for hourly variations in electrical cost. Harshbarger Jr.'s invention shuts down the heat pump when the ambient temperature drops below some predefined shutdown temperature.

Hines, et al. in U.S. Pat. No. 4,386,649 discloses a programmable thermostatic control device utilizing a microprocessor and an interface unit through which the heating, ventilation and cooling system of a building or residence are connected to device outputs. It is processor-based and is compatible with gas, fire, electric heating and cooling system as well as heat pump systems. Hines' system inhibits the auxiliary heat sources during recovery. The apparent intent is to use the system as efficiently as possible, and since the secondary source is electrical resistance heat, it is generally more efficient to operate the heat pump instead of the secondary source. This is not necessarily true for a dual fuel system. Hines does not minimize electrical demand cost nor does he predict heat and electrical loads or calculate a break-even demand set point.

The present invention provides advantages not offered in the aforementioned prior art for a dual fuel system including a prediction of monthly loads and a computation of break-even demands. The present invention has as a primary objective minimization of the total monthly bill to the energy consumer through the use of a unique implementation which integrates an intelligent demand logic algorithm into an operating thermostat.

SUMMARY OF THE INVENTION

A dual fuel heat pump system consists of a heat pump unit for heating and cooling and a gas furnace for supplemental heating. FIG. 1 shows schematically a block diagram of a building heating control system employing a dual fuel heat pump system as contemplated by the present invention. The dual fuel heat pump unit 10 includes a heat pump stage 12 and a gas furnace 14 controlled by intelligent demand logic (IDL) controller 30. The building temperature is regulated by thermostat 16. A typical unit consists of two stages of heat pump and two stages of gas heat providing up to 160,000 Btuh of gas furnace heat and up to 80,000 Btuh of heat pump heat at rating conditions of 47° F. The thermostat may be, for example, a Honeywell T7400 thermostat interfacing with a building controller such as the Honeywell W7400 controller as manufactured by Honeywell Inc. of Minneapolis, Minn. Supply air is provided by the dual fuel heat pump unit 10 in conduits 20 and return air is pumped from the building 22 back into the dual fuel heat pump unit by means of conduits 24. Signals representative of ambient temperature, building load and building temperature are provided to the controller 30 by lines 32, 34 and 36, respectively. The intelligent demand logic controller 30 develops algorithms for an active electric demand control to reduce the building heating costs and increase the cost effectiveness of the dual fuel heat pump system.

The invention provides a dual fuel heat pump controller which controls the use of heat pump stages and gas furnace stages to provide building heating load while minimizing the total utility bill to the customer and maintaining comfort. This is accomplished by operating the IDL controller to optimally schedule the use of heat pump stages or gas heat stages to provide building heat requirements given the following factors: (a) building non-heat pump electric profile; (b) gas energy and time of day electric energy rates; (c) electric demand periods, demand rates and demand computation methods; (d) heat pump and gas furnace cycle rate constraints; (e) heat pump and gas furnace minimum on and off times; (f) performance characteristics of the heat pump as a function of ambient temperature; and (g) performance characteristics of the gas furnace.

It is one object of the invention to provide a dual fuel heat pump controller which adapts to different utility rate structures.

It is another object of the invention to provide a dual fuel heat pump controller which controls a plurality of heating stages.

It is yet another object of the invention to provide a dual fuel heat pump controller which schedules the most cost efficient heating stage on a priority basis.

It is yet another object of the invention to provide a dual fuel heat pump controller which determines times and conditions which are cost effective for heat pump use.

It is yet another object of the invention to provide a heat pump controller and heating system which is self-starting in the event of a power failure.

It is yet another object of the invention to provide a dual heat pump controller which provides significant savings over traditional demand lockout controllers.

Other objects, features and advantages of the invention will become apparent to those skilled in the art through the description of the preferred embodiment, claims and drawings herein, wherein like numerals refer to like elements.

DESCRIPTION OF THE PREFERRED EMBODIMENT

Figure 2:
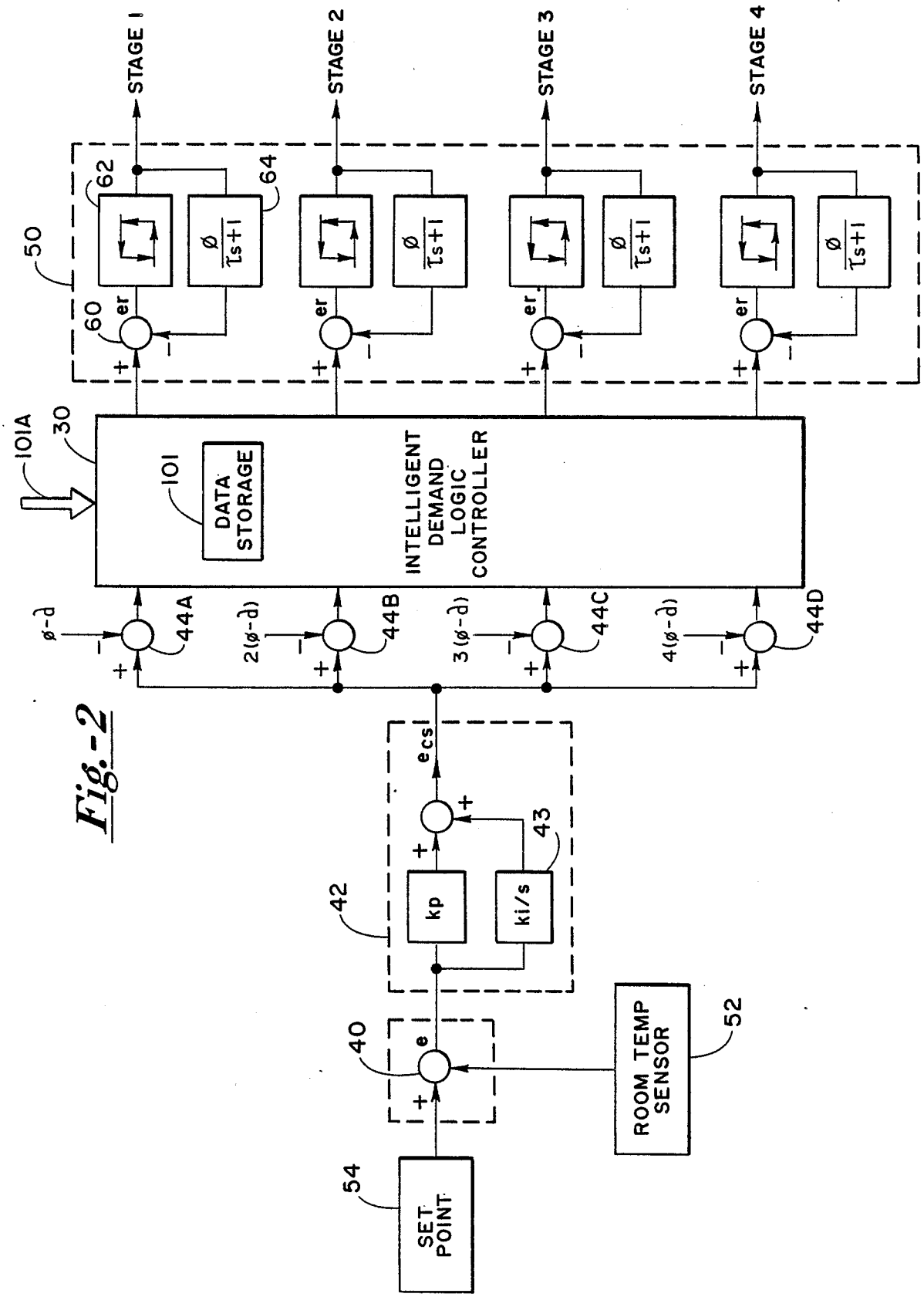
FIG. 2 illustrates one implementation of the dual-fuel heat pump controller provided by the invention.

Referring now to FIG. 2, one implementation of the dual fuel heat pump controller as provided by the invention is shown in block diagram form. Included in the apparatus are a four stage thermostat comprising a first summing point 40, a proportional plus integral (PI) controller 42 and thermostat block 50. Also included are second, third, fourth and fifth summing points 44A-44D and intelligent demand logic controller 30. The heating load demand is manifested as the error, e, between the sensed building temperature as provided by the room temperature sensor 52 and the building set point as provided by block 54. The PI controller acts on the error, e, to provide a control signal error, $e_{CS}$. The purpose of the integral portion $K_i/s$ of the controller 43 is to minimize the droop inherent in such systems. The IDL controller determines what part of the signal should go to which anticipator block of the thermostat. The PI controller constants $K_p$ and $K_i$, the anticipator heat $\phi$, the dead band, $\delta$ and anticipator time constant $\tau$ are thermostat designed parameters well known in the art. The parameters are selected in a well known manner to achieve desired cycling performance. For example, the anticipator time constant can be calculated to achieve either a four-cycle-per-hour (as may be used for a heat pump) or eight-cycle-per-hour (as may be used for a gas furnace) unit cycle rate.

As illustrated in FIG. 2, the thermostat block 50 is shown as having four-stages wherein each stage comprises a summing point 60, a hysteresis loop 62 and an anticipator block 64. It will be recognized that this embodiment is shown for illustrative purposes only and not to limit the invention to a four-stage thermostat. While the example shown contemplates the use of a two-stage heat pump controlled by stages 1 and 2 of the thermostat 50 and a two-stage gas furnace controlled by stages 3 and 4 of the thermostat 50, the invention may be implemented with any number of stages within a dual fuel heat pump scheme.

Figure 1:
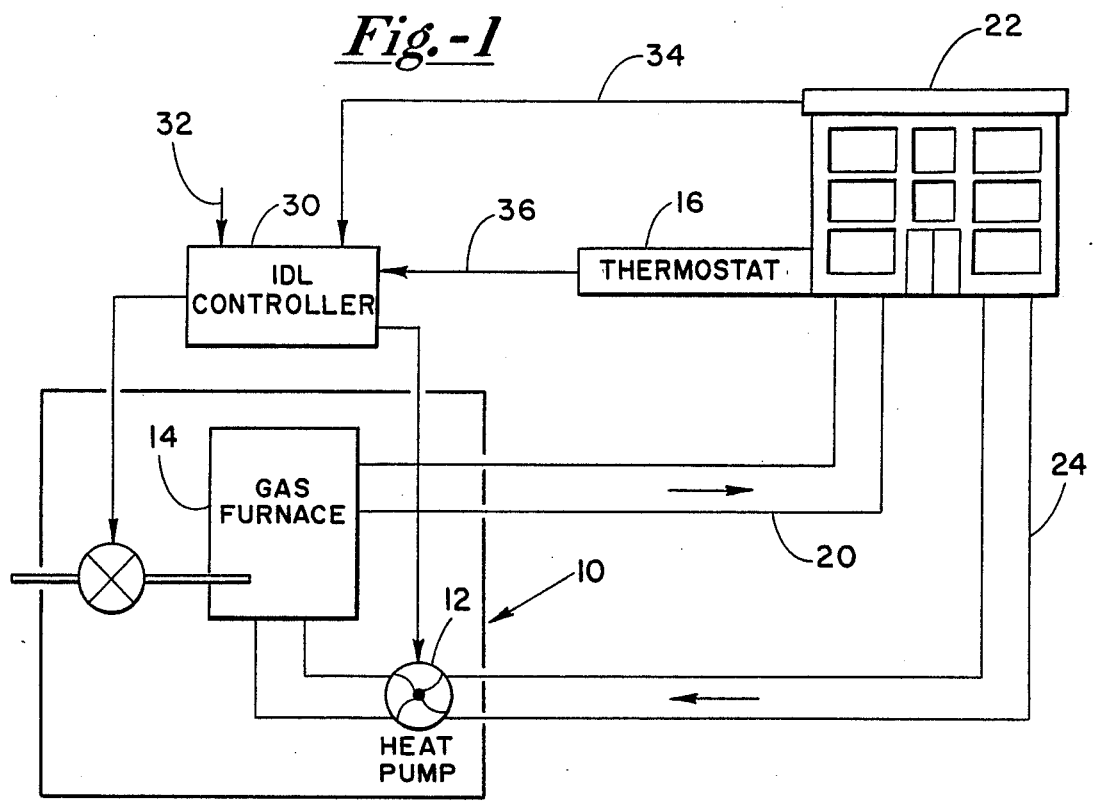
FIG. 1 is a block diagram which schematically illustrates a building heating control system employing one embodiment of the invention.

The intelligent demand logic controller further includes data storage 101 for storing data including the building load (herein also referred to as building kW), the heat pump load (herein also referred to as heat pump kW) and the ambient temperature as shown in FIG. 1. Also provided as data to input port 101A are the electric rate structure, cost of natural gas, and manufacturing data for the heat pump and gas furnace. The manufacturing data includes information including, for example, the coefficient of performance (COP) table, heat pump capacity, furnace capacity and gas efficiency parameters of the furnace. All of the above factors are used in the computer algorithms of the invention to provide control for the dual fuel heat pump system of the invention.

Figure 3:
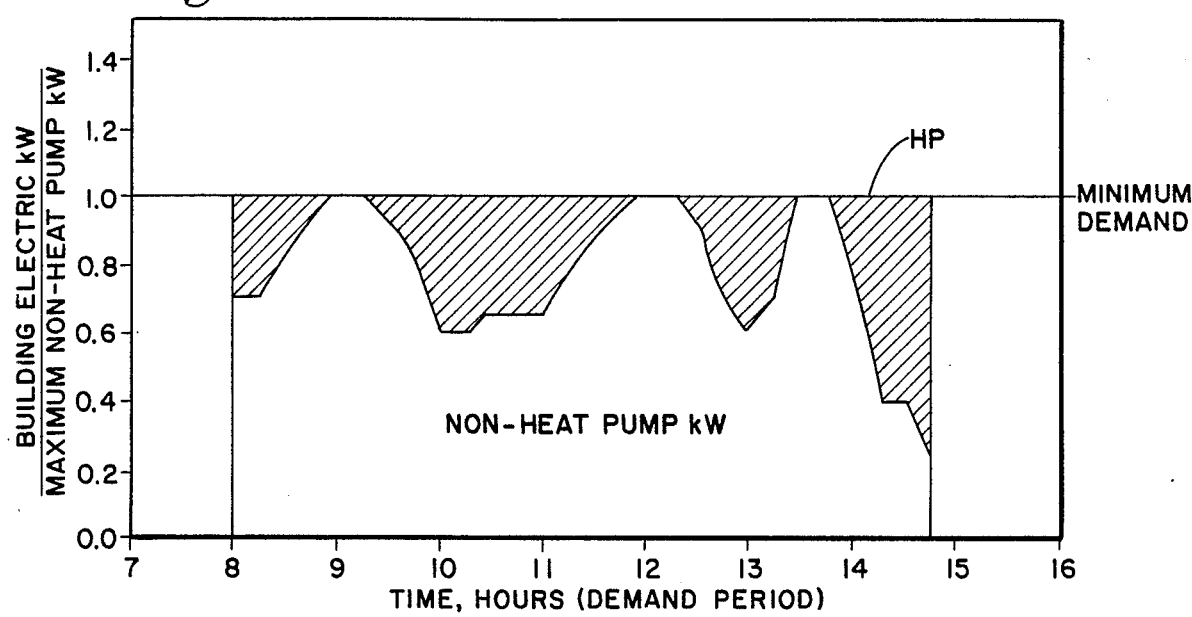
FIG. 3 graphically illustrates a profile of available non-heat pump energy and energy available for heat pump use without incurring additional demand charges.

Referring now to FIG. 3 a profile of available non-heat pump energy is shown in contrast to energy available for heat pump use without incurring additional demand charges. The electrical energy available for heat pump use is in the cross hatched area designated HP. In accordance with the invention, the demand control is implemented by computing the allowable on times for the heat pump in time periods called "demand windows" to maintain the demand set point which, in the case of FIG. 3, coincides with the minimum demand. For the purposes of explaining the invention within the context of the example of the preferred embodiment illustrated herein, it may be assumed that a 15 minute demand window is used as is typical in the industry. The electrical energy available is calculated first as the difference between the demand set point and the predicted non-heat pump power for the 15 minute slot. The allowable on-time is the ratio of the electrical energy available to the stage power input multiplied by the length of the demand window. The minimum demand is determined by the maximum peak non-heat pump electrical energy used in any given demand window during the demand period. If the IDL controller determines there is available power for the heat pump from the profile data as shown in FIG. 3, a cost comparison of electrical and gas energy is computed. If the heat pump is the lower cost energy source and the allowable on-time exceeds the specified minimum on-time for the heat pump, the heat pump will be designated the priority unit for heating. Otherwise, gas heat will be used.

The IDL controller predicts the non-heat pump electric power input profile using historical measured data. The average non-heat pump power is calculated for a 15 minute period as the difference between the building power input and the power input to the heat pump system. A simple moving average technique is used to predict the non-heat pump power for 15 minute window slots during each 24 hour period for a week. In one example embodiment of the invention, data is stored in a 96×7 matrix by conventional means. The maximum of the 15 minute average values of the non-heat pump power for a given demand period is the minimum demand charge the customer will pay in that period. If the cost of the heat pump energy at the current ambient temperature is less than the cost of using gas heat, then the heat pump priority is flagged by the controller.

Figure 4:
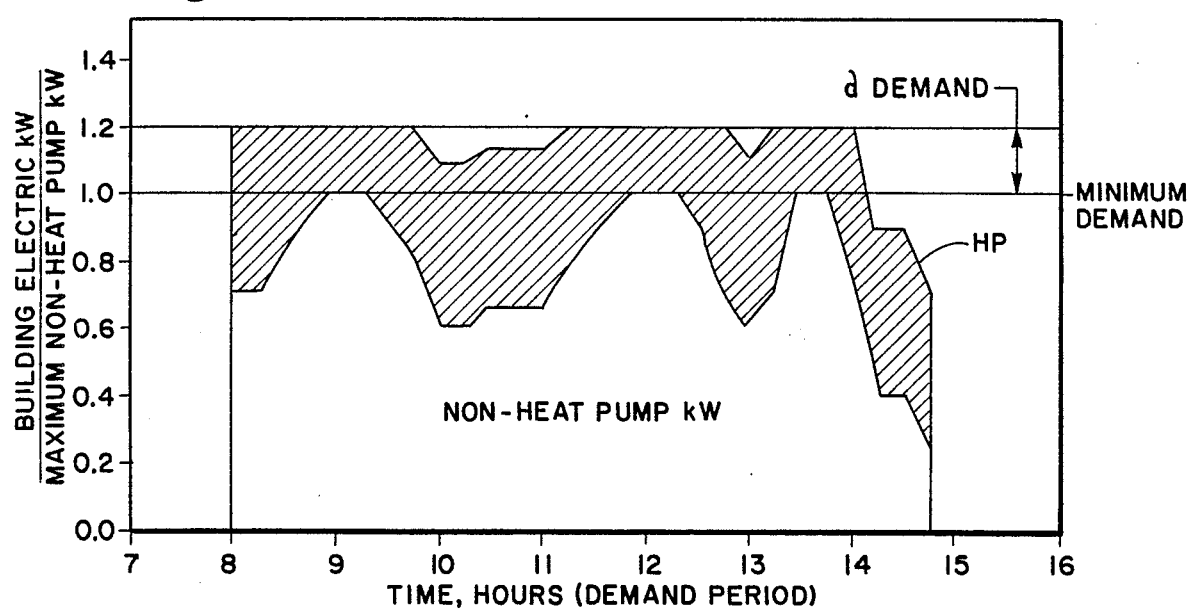
FIG. 4 graphically illustrates the break-even demand concept as employed in a further aspect of the invention.

Now referring to FIG. 4, the break even demand concept as employed in a further aspect of the invention is shown. At the beginning of each billing period, a break even demand is computed, which will raise the building demand over the minimum demand computed using the non-heat pump profile. The break-even demand computation determines if the cost of paying for the additional demand to provide more heat pump usage is worth the cost of energy savings due to the use of the heat pump over the gas heat. For this computation, the incremental load during the demand period as can be provided by the heat is pump calculated by using data representative of the on-times and capacities of the heat pump and furnace units. The total incremental energy for the month is predicted by multiplying the incremental daily load by the number of working days. The incremental demand, δ−demand is calculated by dividing the total energy by the length of the period and an average coefficient of performance (COP). The average COP is calculated using a predicted monthly average ambient temperature. The demand set point is the sum of the minimum (i.e. non-heat pump) power demand and the incremental break-even demand, δ−demand.

In one example embodiment of the invention the following assumptions were incorporated in implementing the invention:

(a) demand windows were fixed at 15 minute intervals;

(b) demand windows were either signaled by the utility company or set at fixed times;

(c) manufacturers data or equations used for heat pump COP, capacity and power were used as a function of ambient temperature;

(d) average monthly ambient temperatures were treated as a sinusoidal function of time with minimum and maximum temperatures for a given location taken from the ASHRAE handbook;

(e) non-heat pump electric load profiles were treated as being weekly periodic; and (f) cycling rates at minimum on-off times for gas furnace and heat pump compressor were used as recommended by the manufacturer.

Data required for the IDL controller includes the indoor air temperature as provided by the thermostat, actual building power input, ambient temperature, heat pump power input, time of day and calendar information.

Figure 5:
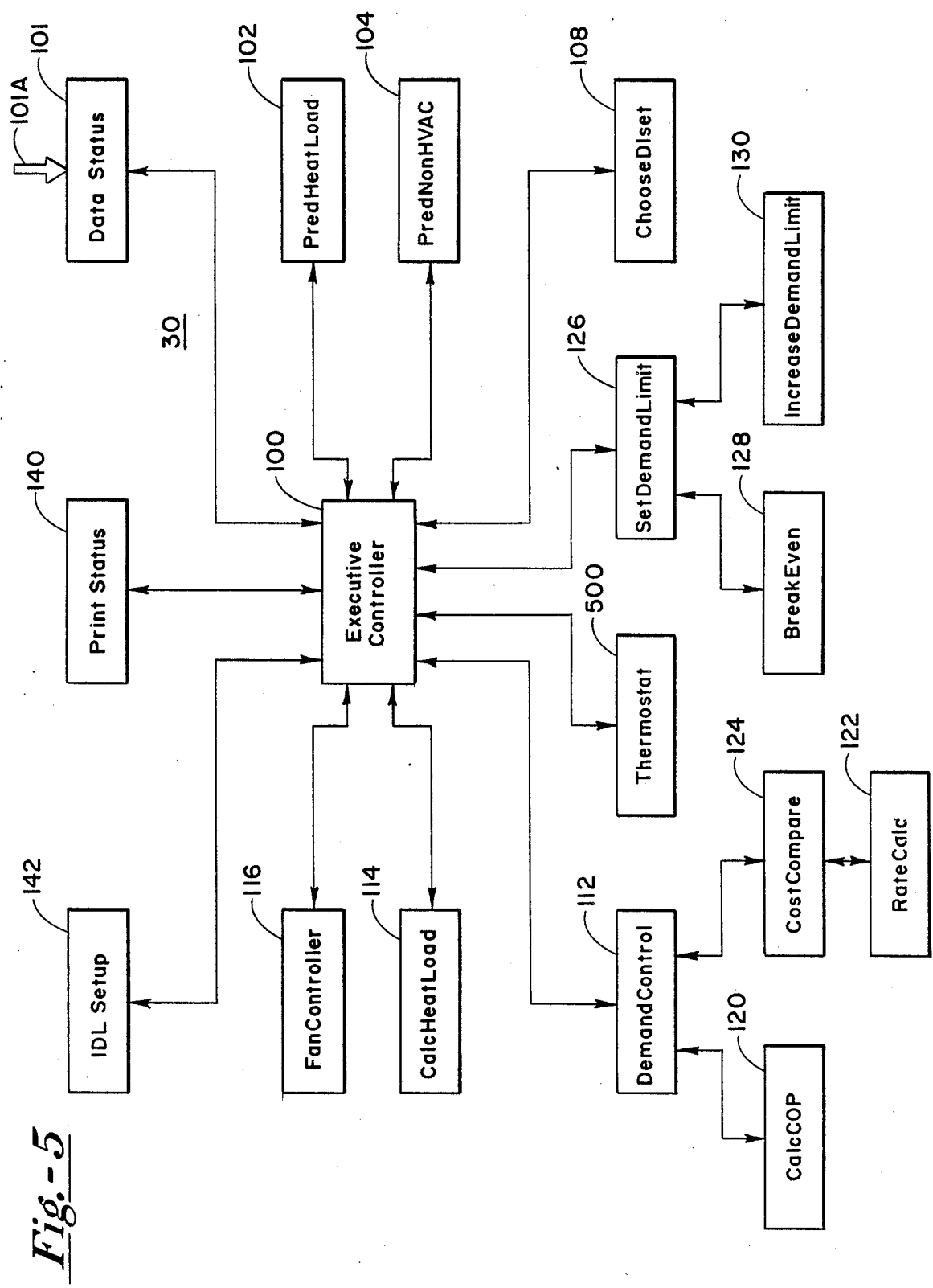
FIG. 5 is a controller structure chart illustrating computer algorithms employed in one aspect of the invention.

Having described the operation and main elements of the invention, a more detailed description of the computer algorithms follows. Referring now to FIG. 5, a structure chart illustrating the computer algorithms employed in the IDL controller in one aspect of the invention is shown. The IDL controller 30 includes a plurality of computer algorithms which are executed in order to provide a dual fuel heat pump control. The computer algorithms are divided into a number of modules or routines including the executive controller 100, a fan controller 116, a module for calculating heat load 114, a module for calculating the amount of time each heat pump stage can be on during the demand window 112, a thermostat module 500, a module for predicting non heat pump electrical load based on a moving average 102, a module for predicting total heat load based on a moving average 104, a module for setting the demand limit set point 106 and a module for setting the demand limit 126.

As implemented in one embodiment of the invention made by Honeywell Inc. the following acronyms were used corresponding to the definitions shown below.

| Data Dictionary | |
| --- | --- |
| Ambient temp: | Outdoor air temperature (degrees Fahrenheit) |
| BldgKW: | Total electrical power input to the building (kW) |
| BreakevenCOP: | Heat pump COP required for economic break-even |
| Change in dlset: | Recommended change in demand limit set point (kW) |
| Clock time: | Time of day in 24-hour clock |
| Controller status: | Indicates whether controller is running, initializing, in startup mode or responding to emergency signal |
| COP: | Current heat pump COP |
| Day: | Represents day of week in order to access arrays (0–6) |
| Demand: | Charge for demand ($/kW) |
| Dlset: | Demand limit set point |
| Erate: | Charge for electric energy ($/kWh) |
| Err1 status: | Flag to redirect error intended to activate heat pump |
| Err2 status: | Flag to redirect error intended to activate heat pump |
| Fan ON/OFF: | Turn fan on or off |
| Fan switch status: | Whether fan is on, off or in auto mode |
| Gas rate: | Charge for gas energy ($/MBtu) |
| Heat pumpKW: | Energy used by heat pump (kW) |
| Heatload: | Total Btu supplied by heating system |
| Increase flag: | Flag to increase demand limit beyond maximum non-heat pump limit |
| Ion1: | Stage 1 (heat pump) ON/OFF flag |
| Ion2: | Stage 2 (heat pump) ON/OFF flag |
| Ion3: | Stage 3 (furnace) ON/OFF flag |
| Ion4: | Stage 4 (furnace) ON/OFF flag |
| Mode: | Heating or cooling mode |
| Month: | January = 1, December = 12 |
| NonHVACLoad: | Difference between BldgKW and Heat pumpKW |
| Occupied status: | Whether building is occupied or not |
| Period length: | Length of a demand period (peak or mid-peak) |
| Priority: | Whether to use gas or electrical heat |
| Rate period: | Peak, mid-peak or off-peak periods |
| Set point array: | Set points for peak, mid-peak or off peak periods |
| Slot: | Number of the current 15-minute slots (ranges from 0-95) |
| Tsensed: | Sensed indoor air temperature (°F.) |

IDL Controller

The IDL controller 30 comprises an executive computer algorithm 100 that calls a plurality of major modules including demand control 112, prediction modules 102 and 104, data storage and acquisition routines 101, and demand limit setting routines 126 and 108, as well as directly or indirectly calling into service the remaining routines. Input into the executive controller 100 through data lines represented by input 101A is data including time (including the month, day, period and clock time) thermostat data (including $T_{SENSED}$ Fan Mode, and Occupied Status) ambient temperature, building kW, heat pump kW, system restart flag and utility emergency signal data. The executive controller 100 presents the on/off status for heating stages and the controller status to each of the major modules as shown in FIG. 5.

At the beginning of the billing period, the executive controller determines the demand limit set points based on expected ambient temperature, expected heating load and expected non-heat pump kW usages. At the beginning of each 15 minute period, the controller determines the expected non-heat pump kW usage and calculates allowable on-time for each heat pump stage. At each step within the 15 minute period, the controller executes the thermostat and controller algorithms in order to determine heat pump/gas furnace status. The heating load and non-heat pump kW load is monitored at each 15 minute interval to update the prediction routines.

Demand Control Module

Demand control module 112 calculates the amount of time each heat pump stage can be turned on during a 15 minute window and monitors the duration that each stage has already been on within the window. The demand control module receives the following inputs from the controller: an initialization flag, demand set point, predicted non-heat pump load, ambient temperature, clock time, slot number and day number. The demand control module operates to output the stage 1 control status and the stage 2 control status. The demand control module calculates the difference between predicted non-heat pump kW input and the demand set point to determine available electrical energy for heat pump use. Maximum on-times are calculated for each heat pump stage, based on the power consumption at the current ambient temperature. When the stages are turned on, their total on-time during the current 15 minute window is tracked and compared against the allowable on-time for the window. Stages are turned off when the allowable on-time is reached. This routine also checks the gas and electric energy rates in data storage to determine which is cheaper and turns off heat pump stages if the gas furnace is cheaper for heating. Minimum on/off time requirements for heat pump stages are also checked to assure proper running times are maintained.

Thermostat

In the illustrative example of the preferred embodiment of the invention as described herein, the thermostat module 500 comprises a four-stage thermostat with anticipator loops and proportional plus integral control as described above with reference to FIG. 2 elements 40, 42 and 50. Inputs to the thermostat module from the executive controller 100, include an initialization flag to start the routine, clock time, set point temperature, sensed temperature, stage one control status and stage two control status. The thermostat module outputs on/off status flags Ion1–Ion4 for stages 1–4.

Four anticipator loops in parallel provide on/off signals to heat pump and gas furnace stages as shown in FIG. 2. Error input to the anticipator loops is:

$$E_d = K_p(T_{SET} - T_{SENSED}) + K_i \int (T_{SET} - T_{SENSED}) dt$$

This error is distributed to the four anticipator loops based on the status flags received from the demand control routine. If status flags are zero for either of the first two stages (i.e., the heat pump stages) the error is redistributed to stages three and four (i.e., the gas furnace stages). Otherwise, the thermostat behaves as a normal four-stage thermostat.

The following equations are used for each anticipator loop:

$$E_r = E_d - x(t), \text{ where } dx/dt = (\Theta - x)/t.$$

The anticipator loops work as follows. The error to each loop is offset by a value of $\Theta - \delta + d$, where $\Theta$ is the heat of anticipation, $-\delta$ is the breakpoint and d is the offset between the make point of one stage and the breakpoint of the next stage. If the modified error is less than the break point, the output status and $\Theta$ for that stage are set to zero. If the modified error is greater than $Z_M$ the output status is set to 1, and $\Theta$ is returned to its original value.

PredictNonHVACLoad

Module 104 predicts non-heat pump electrical load based on a moving average. Inputs received from controller 100 include building kW, Heat pump kW, 15-minute slot number and day number. The module operates to store data for each 15-minute window and each day of the week, for example, in a 7×96 matrix. This matrix is used as a global variable by the system. The first week's data is used initially to fill the matrix. After the first week, a moving average is kept for each slot in the matrix, based on data acquired.

PredicHeatLoad

Module 102 predicts total heat load based on a moving average. Inputs received form controller 100 include heat load, 15minute slot number, and day number. The module operates to store data for each 15 minute window and each day of the week, for example, in a 7×96 matrix. This matrix is used as a global variable by the system. The first week's data is used to fill the matrix initially. After the first week, a moving average is kept for each slot in the matrix, based on data acquired.

SetDemandLimit

Module 126 sets the demand limits for off-peak, mid-peak and peak periods. Inputs received from controller 100 include month number, and rate period type. SetDemandLimit use sub-modules BreakEven 28 and INcreasDemandLimit 130. For each demand period (for example, peak, mid-peak, or off-peak) the following steps are executed. First the algorithm selects maximum predicted non-heat pump kW usage. Then it determines whether the average ambient temperature is high enough for the heat pump to be used economically. If the temperature is high enough, an attempt to increase the demand limit is made by calling the BreakEven and IncreaseDemandingLimit modules into operation.

BreakEven

Module 128 computes the break-even demand limit to determine if the demand set point should be increased to increase savings and outputs the break-even COP and increase demand flag to the SetDemandLimit module. Inputs used by BreakEven include rate period type, average ambient temperature, period length and the number of heating periods in the current month. BreakEven uses modules CalcCOP and RateCalc to provide calculations of COP and utility costs. The break-even COP is obtained by setting the increase in cost due to demand increase equal to the savings obtained by using electric heat pump heat instead of gas furnace heat. The total monthly savings is given by:

$$Savings = ((C_{gas}/h)(3.413E-3) - C_{elec}/COP)Bn*H - D*H/COP*f$$

where $C_{elec}$ is the electric energy rate, D is the power demand charge, f is an adjustment factor which can be used to compensate for nonrectangular loads, B is the length of the period, n is the number of periods during the month, $C_{gas}$ is the gas energy rate ($/MBtu), h is the gas furnace efficiency, H is the heat load in kW, and 3.413E-3 converts gas energy rates from $/MBtu to $/kWh. Note that the above equation assumes a rectangular load profile for each period. If this assumption is not valid, the factor f must be used to adjust the break-even COP. By setting the savings to $O_i$, the following equation defines the break-even COP:

$$COP_{be} = (C_{elec} + Df/(Bn))/ (C_{gas}/h)(3.413E3).$$

Once the break-even COP is calculated, it is compared against the expected average COP for the month. If the expected COP is higher, an increase in demand is recommended to SetDemandLimit.

IncreaseDemandLimit

Module 130 determines the incremental amount to increase demand limit in order to maximize savings and outputs a new demand set point. Inputs used by this module include rate period type, expected ambient temperature, and break-even COP. The demand set point that allows additional use of the heat pump is computed by the following equation:

$$\delta D = \int (HeatLoad(kW)/COP_{be} + NonHVACLoad - D1set)dt/Period\ Length$$

In the above equation, D1set is the maximum non-heat pump power over the period. The maximum possible power input is the non-heat pump power input plus the power input by using the heat pump as the primary source of heat. The incremental demand is calculated by integrating the difference between D1set and the maximum power input. Note: it is assumed in the above calculation that the load is rectangular over the period. If the actual load profile is not rectangular, the savings obtained by increasing use of the heat pump will be decreased. Therefore, for nonrectangular profiles the change in demand should be adjusted by a factor of:

(Time in period with Heating kW>D1set)/Total time in period in order to compensate for load profile variations.

CalcCOP Module 120 calculates heat pump COP. Inputs used by CalcCOP include ambient temperature, stage 1 status and stage 2 status. CalCOP uses the following equations for COP.

$$Stage\ 1: COP = 0.293*(9.042 + 0.7191 T_{amb})/(1.795 + 0.03609 T_{amb});$$

$$Stage\ 2: COP = 0.293*(25.184 + 1.277 T_{amb})/(3.522 + 0.07378 T_{amb}).$$

These equations are based on manufacturer's data.

CostCompar

Module 124 compares cost per thermal kW for gas and heat pump heat. Inputs required to run CostCompare include ambient temperature and rate period type. CostCompare runs RateCalc 122 and CalcCOP to determine priority. It computes unit cost per thermal kW using the following equations:

$$C_{gas}(\$/kWh) = Gas\ Cost\ (\$/MBtu)* (3.413E-3)(MBtu/kW-h)/h;$$

$$C_{elec}(\$/kWh) = Electric\ Cost\ (\$kW-h)/COP.$$

A flag is set to indicate which fuel is cheapest in the current period.

RateCalc

Module 122 calculates utility costs and outputs the electric rate, demand rate and gas rate. Inputs required are an initialization flag and rate period type. RateCalc compares rate-period type with user-defined rates, returns proper cost for the period type. When initialization flag is set, the user inputs the electric cost and demand charge for each period type along with the gas cost.

FanController

FanController module 116 implements indoor fan logic and provides on/off status control signals for the indoor fan as outputs. Inputs required include mode, occupied status, Ion1, Ion2, Ion3, Ion4. If heat is on or fan is requested on with occupied status by the executive controller, the fan is turned on.

CalculateHeatLoad

Module 114 calculates total heating load and outputs the load number. Inputs required are Ion1, Ion2, Ion3, Ion4 and the ambient temperature. CalculateHeatLoad uses fixed capacity for gas furnace and uses regression equations for heating pump capacity as a function of ambient temperature. CalculateHeatLoad returns the total heating load in Btu for the 15 minute period to the Executive Controller.

PrintStatus

Module 140 prints out the status of IDL controller.

IDLSetuo

Module 142 is a user interface to set up rate periods. IDLSetup takes user input and fills a period type field in a global non-heat pump information matrix.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

Figure 6:
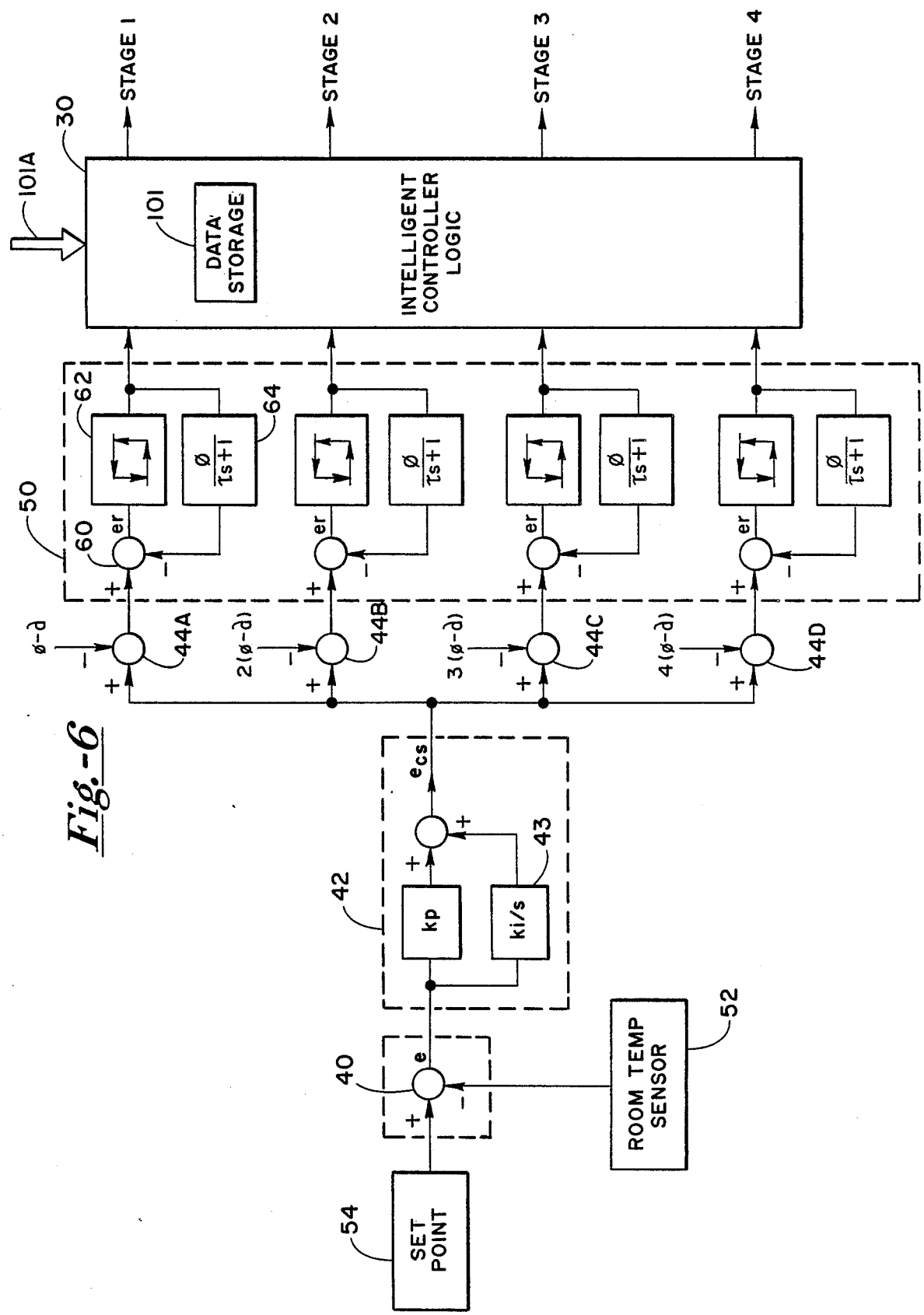
FIG. 6 illustrates another implementation of the dual fuel heat pump controller provided by the invention.

For example, referring now to FIG. 6, another aspect of the invention is shown. In this alternate embodiment of the invention, the four stage thermostat block 50 is interposed between the summing points 44A-44B to operate on the error control signal prior to presenting the signal to the intelligent controller logic 30'. The intelligent controller then uses the preprocessed thermostat information together with other data and calculations as described above with reference to the embodiment in FIGS. 2 and 5 in order to directly control the heat pump and furnace stages. Generally, the dual fuel heat pump controller of the invention may be implemented in various apparatus including, but not limited to, large scale integrated circuits, CMOS logic and equivalent electronics.

What is claimed is:

1. An operating method for a dual fuel heating system having an energy profile including a demand set point, first and second heat pump stages, first and second gas furnace stages, an executive controller for tracking time increments and implementing call control strategies at appropriate intervals, a demand control for calculating the amount of time each heat pump can be on during a predetermined time window, a data storage means, a thermostat means, first predicting means for predicting non-heat pump electrical load based on a moving average, second predicting means for predicting heat load based on a moving average, limiting means for setting demand limits for off-peak, mid-peak and peak periods wherein the operating method comprises the steps of:
   (a) operating the executive controller to initiate operation of the demand control, the thermostat means, the first predicting means, the second predicting means, the data storage means, and the limiting means, and further operating the executive controller to assign a priority unit for heating;
   (b) operating the first predicting means in response to the executive controller to store non-heat pump electrical load data in a first matrix including slots for each time window and each day of the week and to keep a moving average for each slot in the first matrix;
   (c) operating the second predicting means in response to the executive controller to store total heat load data in a second matrix including slots for each time window and each day of the week and to keep a moving average for each slot in the second matrix;
   (d) operating the executive controller to determine whether there is available power for the heat pump stage in the current time window where available power is calculated as the difference between the demand set point and predicted non-heat pump power;
   (e) if heat pump power is not available as determined in step (d), operating the executive controller to assign the highest priority the gas furnace stage;
   (f) if heat pump power is available, operating the executive controller to calculate an allowable heat pump stage on time, compare the calculated allowable on-time with a specified minimum on-time and make the heat-pump the priority unit for heating if the allowable on-time is not less than the specified minimum on-time; and
   (g) operating the thermostat to activate the heat pump stage and the furnace stage responsively to the priorities assigned by the executive controller.

2. The method of claim 1 wherein demand periods comprise peak, mid-peak and off-peak demand periods and wherein the demand limit is set by operating the demand control to select the maximum predicted non-heat pump electric energy uses as the demand limit.

3. The method of claim 2 further including the step of operating the demand control to compute a break even demand limit to determine an incremental increase for the demand set point.

4. The method of claim 3 wherein the incremental demand increase is calculated according to the equation:

$$D = (HeatLoad(kW)/COP_{be} + NonHVACLoad - D1set)dt/Period\ Length$$

where D1set is the maximum non-heat pump power over the period, D is the incremental demand set point, $COP_{be}$ is the break even coefficient of performance, NonHVACLoad is the non heat pump load in the building, and D1set is the maximum non-heat pump power of the period.

5. The method of claim 4 wherein the break even COP is defined as:

$$COP_{be} = (C_{elec} + Df/(Bn))/(C_{gas}/h)(3.413E\text{-}3).$$

where "$C_{elec}$" is the electric energy rate, "D" is the power demand charge "f" is an adjustment which can be used to compensate for non-rectangular loads, "B" is the length of the period, "n" is the number of periods during the month, "$C_{gas}$" is gas energy rate in dollars/MBtu, and "h" is the gas furnace efficiency.

6. An operating method for a dual fuel heating system having an energy profile including a demand set point, first and second heat pump stages, first and second gas furnace stages, an executive controller for tracking time increments and implementing call control strategies at appropriate intervals, a demand control for calculating the amount of time each heat pump can be on during a predetermined time window, a data storage means, a thermostat means, first predicting means for predicting non-heat pump electrical load based on a moving average, second predicting means for predicting heat load based on a moving average, limiting means for setting demand limits for off-peak, mid-peak and peak periods wherein the operating method comprises the steps of:
   (a) operating the executive controller to initiate operation of the demand control, the thermostat means, the first predicting means, the second predicting means, the data storage means, and the limiting means, and further operating the executive controller to assign a priority unit for heating;
   (b) operating the first predicting means in response to the executive controller to store non-heat pump electrical load data in a first matrix including slots for each time window and each day of the week and to keep a moving average for each slot in the first matrix;
   (c) operating the second predicting means in response to the executive controller to store total heat load data in a second matrix including slots for each time window and each day of the week and to keep a moving average for each slot in the second matrix;
   (d) operating the demand control to select the maximum predicted non-heat pump power as the demand limit;

(e) operating the executive controller to determine whether there is available power for the heat pump stage in the current time window where available power is calculated as the difference between the demand set point and predicted non-heat pump power;

(f) if heat pump power is not available as determined in step (e), operating the executive controller to assign the gas furnace stage as the highest priority unit;

(g) if heat pump power is available, operating the controller to calculate an allowable heat pump stage on time, compare the calculated allowable on-time with a specified minimum on-time and make the heat-pump the priority unit for heating if the allowable on-time is not less than the specified minimum on-time; and (h) operating the thermostat to activate the heat pump stage and the furnace stage responsively to the priorities set by the executive controller.

7. The method of claim 6 further including the step of operating the demand control to compute a break even demand limit to determine an incremental increase for the demand set point.

8. The method of claim 7 wherein the incremental demand increase is calculated according to the equation:

$$D = (HeatLoad(kW)/COP_{be} + NonHVACLoad - D1set) dt / Period\ Length$$

where D1set is the maximum non-heat pump power over the period, D is the incremental demand set point, $COP_{be}$ is the break even coefficient of performance, NonHVACLoad is the non-heat pump load in the building, and D1set is the maximum non-heat pump power of the period.

9. The method of claim 8 wherein the break even COP is defined as:

$$COP_{be} = (C_{elec} + Df/(Bn))/(C_{gas}/h)\ ((3.413E\text{-}3).$$

where "$C_{elec}$" is the electric energy rate, "D" is the power demand charge "f" is an adjustment which can be used to compensate for non-rectangular loads, "B" is the length of the period, "n" is the number of periods during the month, "$C_{gas}$" is gas energy rate in dollars/MBtu, and "h" is the gas furnace efficiency.

* * * * *